United States Patent [19]
Wittbrot, III

[11] Patent Number: 5,911,571
[45] Date of Patent: Jun. 15, 1999

[54] ARTICULATING FISHING LURE

[75] Inventor: H. W. Patrick Wittbrot, III, Milwaukee, Wis.

[73] Assignee: Bioline Manufacturing LLP, Milwaukee, Wis.

[21] Appl. No.: 08/783,031

[22] Filed: Jan. 14, 1997

[51] Int. Cl.⁶ .................................................. A01K 85/00
[52] U.S. Cl. ...................... 43/42.15; 43/42.02; 43/42.09
[58] Field of Search ........................ 43/42.02, 42.09, 43/42.11, 42.15

[56] References Cited

U.S. PATENT DOCUMENTS

| | | | |
|---|---|---|---|
| 1,545,683 | 7/1925 | Nowak | 43/42.15 |
| 1,607,107 | 11/1926 | Weller | 43/42.15 |
| 1,792,366 | 2/1931 | Ettles | 43/42.15 |
| 2,008,250 | 7/1935 | Haas | 43/42.15 |
| 2,209,161 | 7/1940 | Gunderson | 43/42.02 |
| 2,334,792 | 11/1943 | Royston . | |
| 2,357,472 | 9/1944 | Jenkins | 43/42.02 |
| 2,503,529 | 4/1950 | Wardrip | 43/42.15 |
| 2,606,388 | 8/1952 | Croft, Jr. et al. | 43/42.15 |
| 2,606,389 | 8/1952 | Fortmann . | |
| 2,663,964 | 12/1953 | Martin . | |
| 2,674,060 | 4/1954 | Simmons | 43/42.15 |
| 2,685,145 | 8/1954 | Dean | 43/42.15 |
| 2,700,239 | 1/1955 | Ellis | 43/42.15 |
| 2,867,933 | 1/1959 | Stookey | 43/42.02 |
| 2,910,799 | 11/1959 | Wentworth . | |
| 3,284,944 | 11/1966 | Settle | 43/42.15 |
| 3,942,280 | 3/1976 | Ryder et al. | 43/42.15 |
| 4,176,490 | 12/1979 | Phillips | 43/42.15 |
| 4,567,685 | 2/1986 | Duncan | 43/42.15 |
| 4,573,282 | 3/1986 | Rowe | 43/42.15 |
| 4,640,042 | 2/1987 | Rowe | 43/42.15 |
| 4,873,782 | 10/1989 | Gudermuth, Jr. | 43/42.15 |
| 5,058,310 | 10/1991 | Andersen | 43/42.15 |

*Primary Examiner*—Kurt Rowan
*Attorney, Agent, or Firm*—Godfrey & Kahn, S.C.

[57] ABSTRACT

The invention provides an articulating, artificial fishing lure made of three interconnected body elements. A middle body section interfits with and is pivotally connected to a front body element and to a rear body element. The lure can include multiple interlinking middle body sections to increase the length of the lure. An articulated joint element formed from a slot in one body element and an interfitting extension member in the adjacent body element joins the adjacent body elements together. The joint elements enable the body sections to move in relation to each other in both a vertical and horizontal direction to simulate the swimming motion of a bait fish. The front and rear body elements pivot about the middle body element such that the pivot axis of the front/middle sections is at an angle to the pivot axis of the rear/middle sections when the body elements move vertically or horizontally.

16 Claims, 9 Drawing Sheets

ARTICULATING FISHING LURE

FIELD OF THE INVENTION

The invention is directed to a fishing lure having three or more body parts that interfit together for articulated movement.

BACKGROUND OF THE INVENTION

Fishing lures are known in the art for use in trolling to simulate the swimming movement of a bait fish. Such lures are constructed from articulated sections that are arranged relative to each other to move freely and undulate back and forth as the lure is pulled through the water.

An example of such a lure is found in U.S. Pat. No. 2,606,389 (Formann) which discloses a fish lure with pivotally connected head and body sections in which the head swings from side to side. U.S. Pat. No. 4,873,782 (Gudermuth) describes a fishing lure with a front section and a tail section that swivels, rotates and can pivot up and down in a waving motion. Shrimp-like lures are also described that are made with a head, tail and one or more intermediate sections that are hinged together or pivotally connected to provide an arching and straightening movement in the water, for example, U.S. Pat. Nos. 2,334,792 (Royston), 2,663,964 (Martin) and 2,910,799 (Wentworth). Also disclosed is a fish lure made of three articulated components that are hinged together for side-to-side movement as it passes through the water (U.S. Pat. No. 3,942,280 (Ryder)).

A disadvantage of these lures is that the body sections move only from side-to-side or only up-and-down which does not provide a realistic swimming motion of a live bait fish. Another drawback is that their use of hinges and pivot pins to connect the body sections which adds to the complexity of the lure. Such connecting members are also undesirable because they can add unwanted weight to the lure.

SUMMARY OF THE INVENTION

Therefore, it is an object of the invention to provide an articulated fishing lure that more closely simulates the natural movement of a bait fish than the foregoing lures. Another object is to provide an articulated fishing lure that is a simple design and does not require a hinging mechanism or pivot pins for connecting the individual body sections.

These and other objects are achieved by the present invention which is directed to an artificial fishing lure composed of three or more interfitting body elements that provide articulated movement when the lure is pulled through the water. Also provided is a kit that includes the components of the articulating lure.

The body of the articulating fishing lure is composed of an intermitting linking system made of at least three sections that are pivotally joined for articulated movement: a front body element pivotally connected to a middle body element pivotally connected to a rear body element. The lure moves through the water in a generally horizontal plane. The front and rear body elements pivot both vertically and horizontally about the middle body element along axes that are not parallel to each other to provide an undulating movement as the lure moves through the water to mimic the swimming motion of fish. The lure can be made with a plurality of interlinking middle body elements to increase the length of the lure.

An articulated joint element joins the adjacent body sections together. The joint element is composed of a slot in one body element and an interfitting extension member of the adjacent body element that is sized to fit and move freely within the slot. The middle body element has an extension member at one end and a slot in the other end. The front and rear body elements have either an extension member that will fit into the slot of the middle body element, or a slot that will receive the extension member of the middle body element therein.

The middle body section includes a bore therethrough for receiving a pin to secure the middle body element to an adjacent body element that includes a corresponding bore therethrough. A pin can then be inserted into the bore to secure the body elements together. The lure can include one or more hooks attached to a body element, and/or a dive plate attached to the front body section that functions to submerge and hold the lure at a desired water depth.

The three body elements, hook, and other parts of the fishing lure can be packaged together as separate components in a kit for later assembly. The kit can also include instructions for assembly and use of the lure.

Advantageously, the present articulated lure simulates the natural undulating movement of a bait fish in both a side-to-side (lateral) motion and an up-and-down (horizontal) motion. Also, the lure is a simple design with three (or more) intermitting pieces that can be held together in the assembled state with a single pin through a middle body section and an adjacent body section, and does not need a hinge or other additional fastener to connect the pieces together.

BRIEF DESCRIPTION OF THE DRAWINGS

Throughout the following views, reference numerals will be used on the drawings, and the same reference numerals will be used throughout the several views and in the description to indicate same or like parts of the invention.

FIG. 2 is an exploded side view of the fishing lure of FIG. 1, with FIG. 2A: the front body element.

FIG. 5 is an exploded top view of the fishing lure of FIG. 1, with FIG. 5A: the front body element.

FIG. 6B: the middle body element, and FIG. 6C: the rear body element;

FIG. 7B: the middle body element, and FIG. 7C: the rear body element;

FIGS. 8A–8D are perspective views of the assembled fishing lure of FIG. 1, with FIG. 8A: a front to side view, FIG. 8B: a side to under surface view, FIG. 8C: a side to top view.

FIG. 12 is a top plan view of the assembled fishing lure of FIG. 1, showing lateral movement of the front and rear body elements about the middle body element.

DETAILED DESCRIPTION OF A PREFERRED EMBODIMENT OF THE INVENTION

Figure 1:
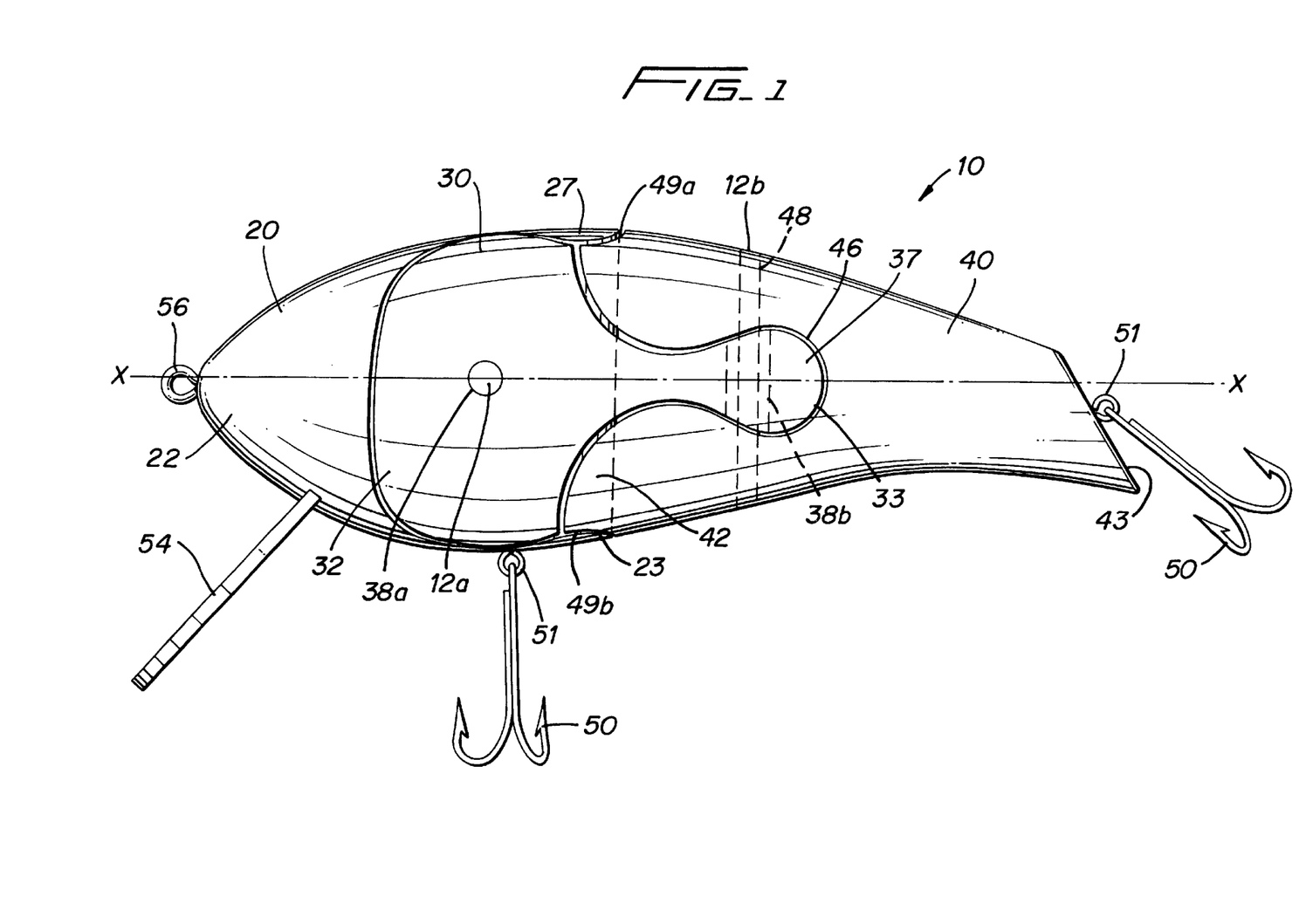
FIG. 1 is side view of an embodiment of the assembled fishing lure of the invention.

Referring now to FIG. 1, one embodiment of the articulating fishing lure, designated generally by the numeral 10, is shown according to the present invention. As depicted, the articulating fishing lure 10 is of a generally fish-like configuration with a head, middle and tail section. It will be understood, however, that a variety of shapes, sizes and links can be accommodated according to the invention.

Referring to FIGS. 1 through 5, the articulating fishing lure 10 is shown having a body made of at least three interfitting sections, a head or front body element 20, a middle body element 30, and a tail or rear body element 40. The adjacent body elements are pivotally joined together by an articulated joint element for articulated movement to simulate the natural swimming motion of a fish. Preferably, the joint element is an interlocking semi-cardioid joint element, as shown in the drawings. As shown, the front body element 20 is pivotally connected to the middle body element 30 which, in turn, is pivotally connected to the rear body element 40. The front body element 20 and rear body element 40 are configured to overlap the middle body element 30 so that the three body elements will remain together in an assembled state as a complete fishing lure unit.

The articulated joint element is formed by the combination of a slot in one body element and an interfitting extension member of the adjacent body element to provide relative movement between the two body elements. An extension member of one body element is sized to be received within a slot in the adjacent body element and to move freely therein.

Figure 2A:
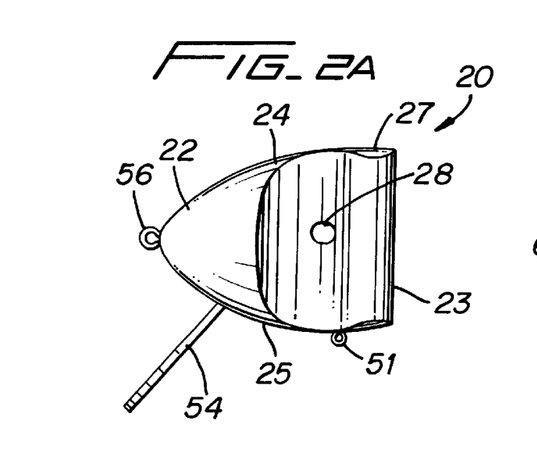
Figure 2B:
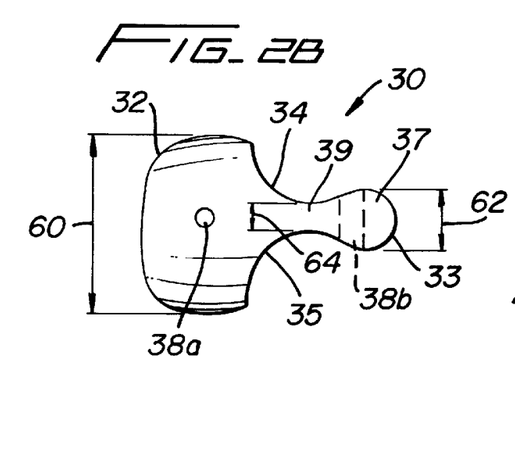
FIG. 2B: the middle body element.

Each of the body elements have a first end portion, a second end portion, and a middle portion thereinbetween. Each of the first, second and middle portions of the body elements have a height and a width. In one embodiment as shown in FIGS. 1–6, the middle body element 30 has a slot 36 in a first end portion 32, an extension member 37 at a second end portion 33, and a middle portion 39. As shown in FIG. 2B, the middle body element 30 is shaped such that the height 60 of the first end portion 32 is greater that the height 62 of the second end portion 33 which is, in turn, greater than the height 64 of the middle portion 39. The front body element 20 has a first end portion 22, an extension member 27 at second end portion 23 that is adapted and sized to be received within the slot 36 of the middle body element 30, and a middle portion 24. The rear body element 40 has a first end portion 42 with a slot 46 sized to receive the extension member 37 of the middle body element 30 therein, a second end portion 43, and a middle portion 47. The rear body element 40 also has a slot 49a, 49b, sized to receive a portion of the extension member 27 of the front body element 20 therein. When assembled together, the extension member of the first body element is inserted into the slot of the middle body element, and the extension member of the second body element is inserted into the slot of the rear body element. The extension members 27, 37 are sized to move freely in the slots 36, 49a, 49b, and 46, respectively, so that the body elements articulate when the lure 10 is pulled through the water. The contact of the extension members of one body element with the side walls defining the slots of the adjacent body element defines contact points that limit the movement of the body elements in both a vertical (up-down) and a horizontal (lateral; side-to-side) direction, and holds the assembled body elements together.

In another embodiment of the fishing lure 10 (not shown), the middle body element 30 can be formed with an extension member at its first end 32 and a slot in a second end 33. The front body element 20 can then include a slot sized to receive the extension member of the middle body element 30 therein, and the rear body element 40 can include an extension member sized to be received within the slot of the middle body element 30.

Figure 4:
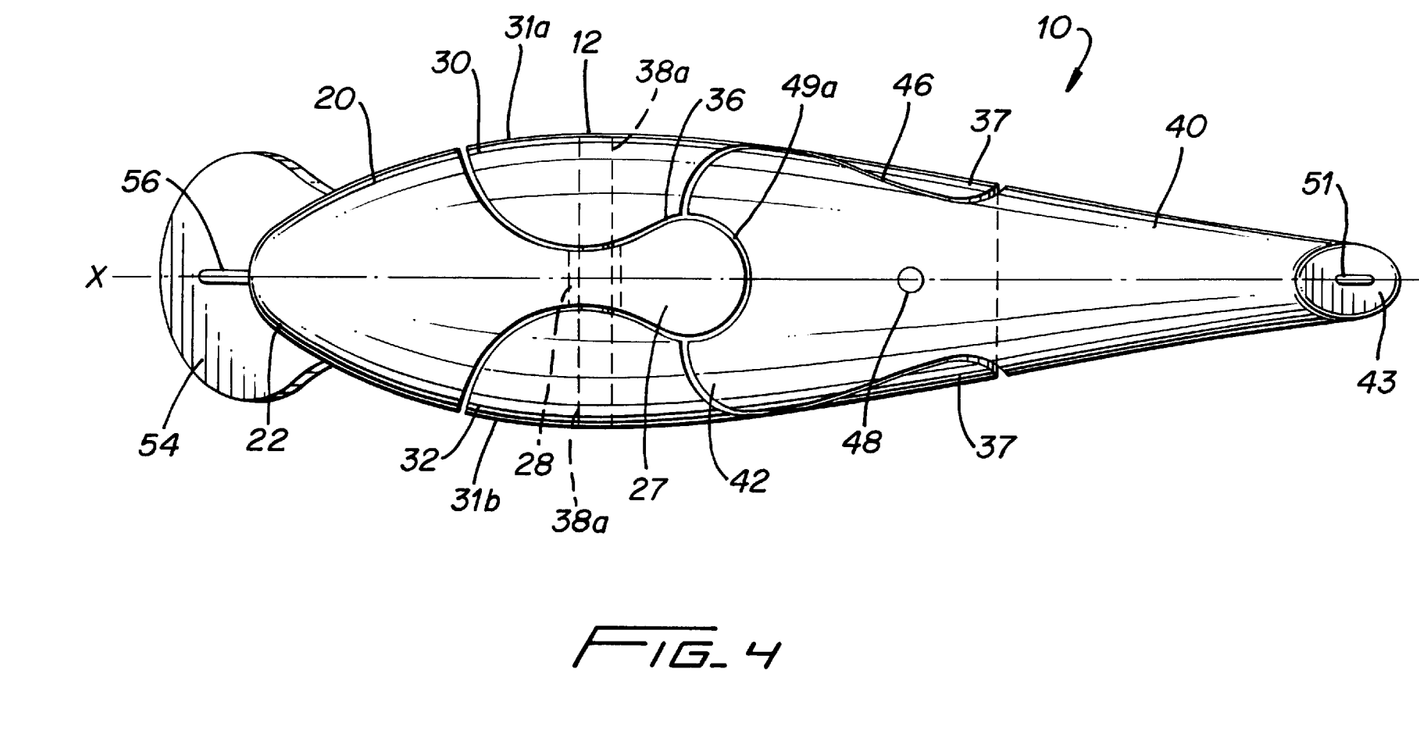
FIG. 4 is a top plan view of the assembled fishing lure of FIG. 1.
Figure 9:
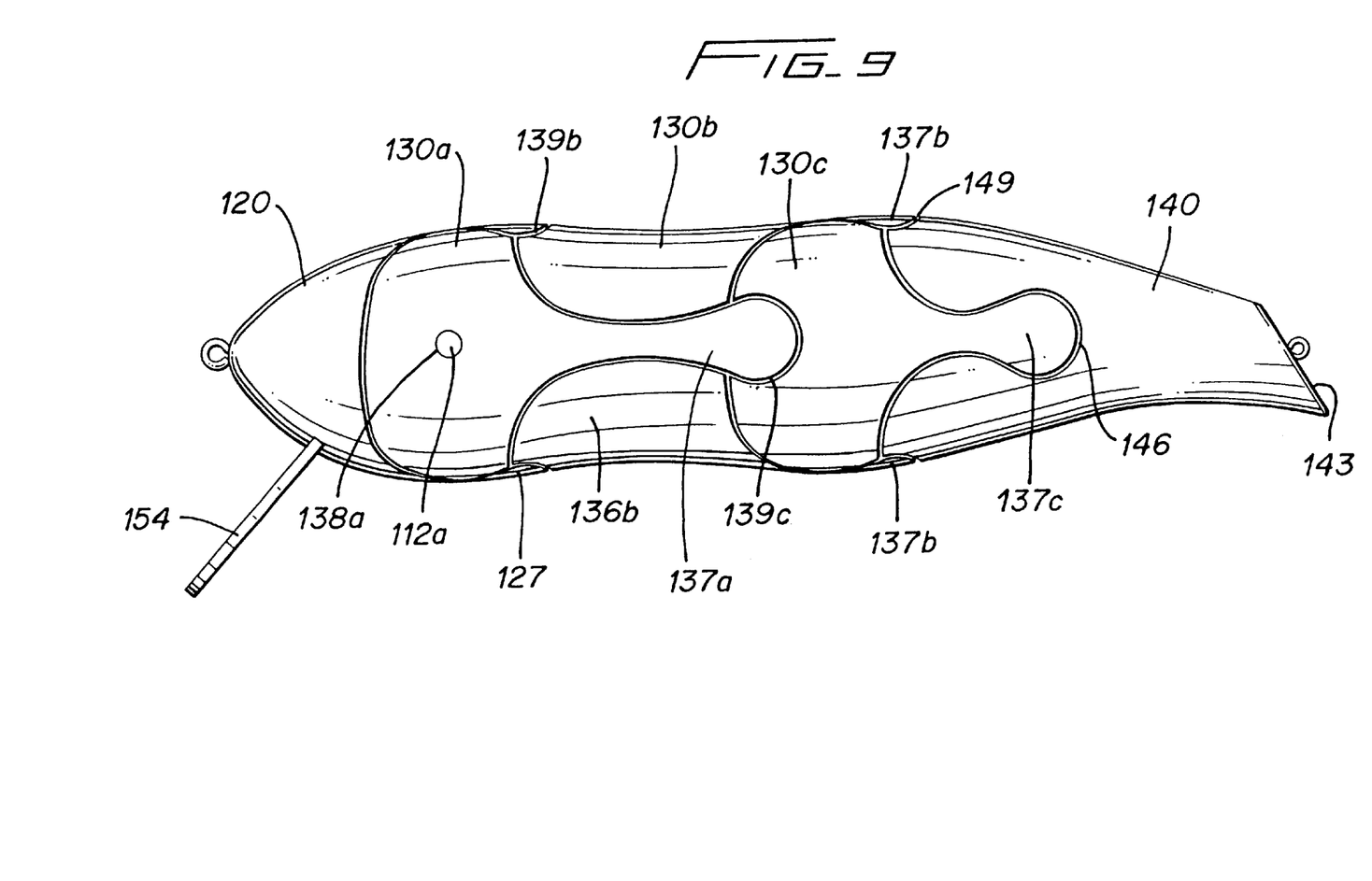
FIG. 9 is a side view of another embodiment of the assembled fishing lure showing multiple middle body sections.
Figure 10:
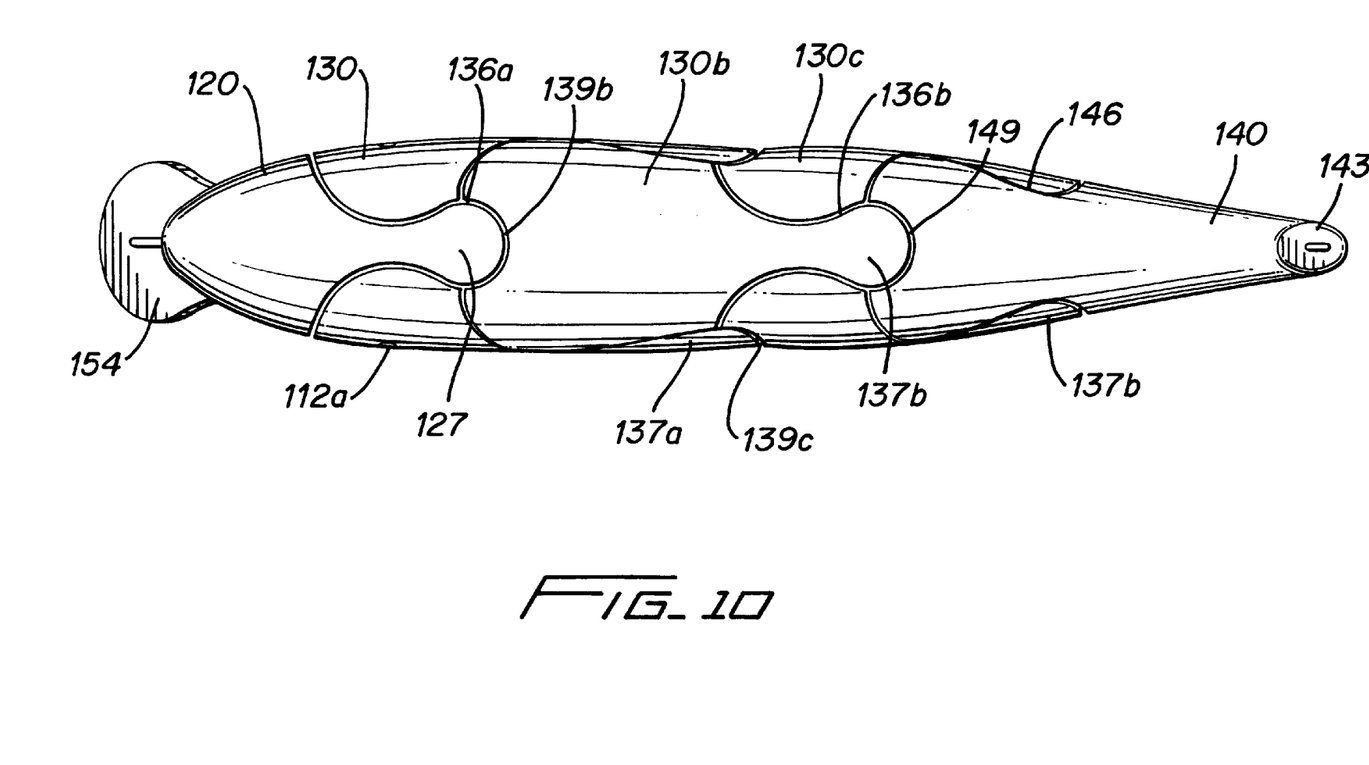
FIG. 10 is a top plan view of the assembled fishing lure of FIG. 9.

Another embodiment of the fishing lure with multiple middle body elements is shown in FIGS. 9 and 10, with the lure designated generally as 100. As shown, lure 100 has three interlinking middle body elements 130a, 130b, and 130c. The front body element 120, the middle body element 130a, and the rear body element 140 are constructed similar to front, middle and rear body elements 20, 30 and 40, respectively as shown in FIGS. 1 and 4. The middle body element 130b has a slot 136b in first end 132b and an extension member 137b at second end 133b. The extension member 137c of the third middle body element 130c links into slot 146 of the rear body element 140. A pin 112a is preferably inserted into bore 138a of the front body element 120 and middle body element 130a to hold the body units of the lure together.

Figure 11:
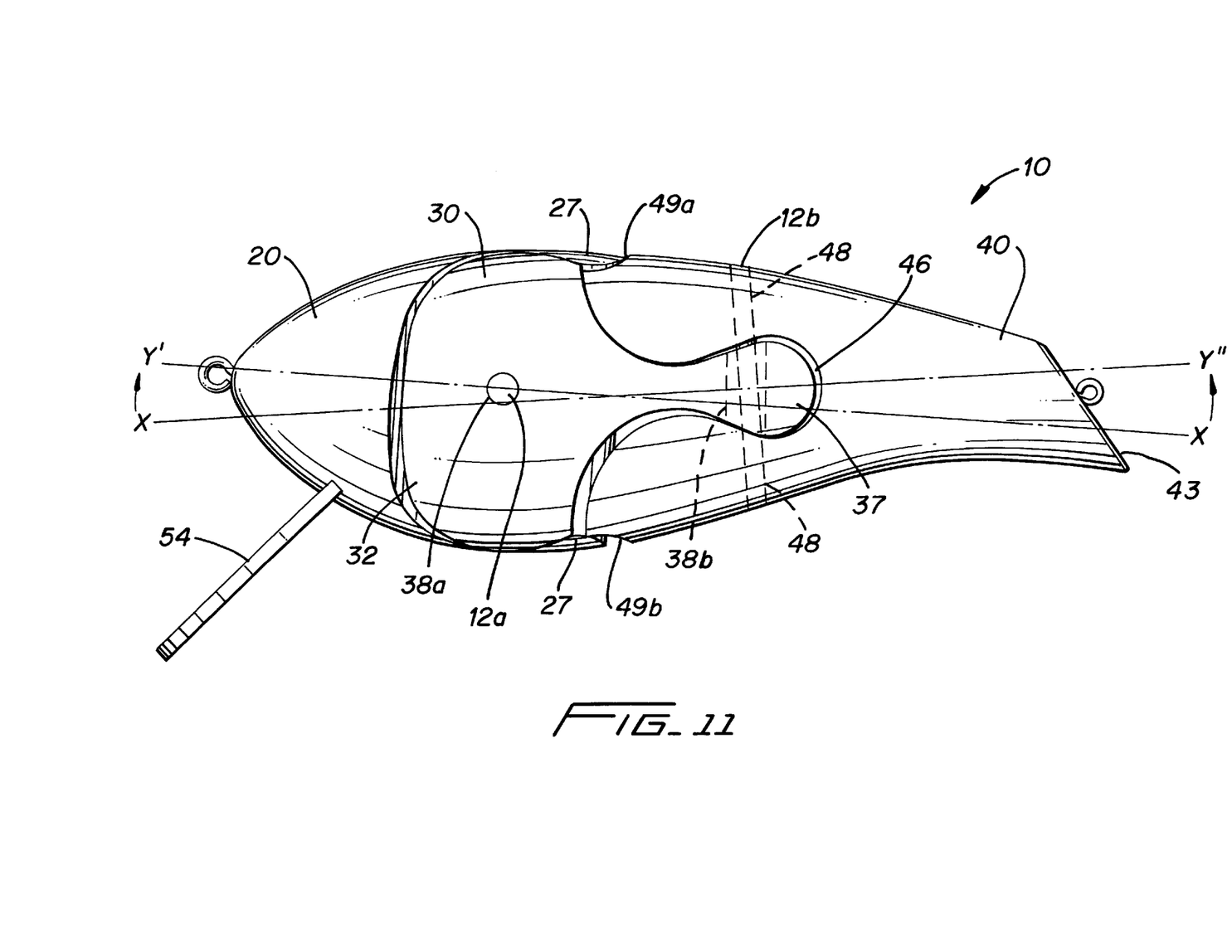
FIG. 11 is a side view of the assembled fishing lure of FIG. 1, showing horizontal movement of the front and rear body elements about the middle body element.

Referring to the embodiment depicted in FIGS. 1 and 4, the three body elements are shown aligned along a common axis X. Pivotal movement of the body elements is depicted in FIGS. 11 and 12. Front body element 20 and the rear body element 40 pivot about the middle body element 30 along both a vertical plane as shown in FIG. 11, and along a horizontal plane as shown in FIG. 12, to simulate up/down and side-to-side movement of a swimming bait fish. Referring to FIG. 11, the front body element 20 and the rear body element 40 pivot in a vertical direction from original axis X to along axis Y' and Y", respectively, and horizontally from original axis X to along axis Z' and Z", respectively. It is understood that the front and rear body elements pivot vertically and horizontally in the direction opposite to that shown in FIGS. 11 and 12. The pivot axis Y' and Z' of the front body element 20 is at an angle and not parallel to the pivot axis Y" and Z" of the rear body element 40, which gives the lure a curved shape during movement. Preferably, the front body element 20 pivots vertically about 4° and laterally about 6°, and the rear body element 40 pivots vertically about 6° and laterally about 7°, such movement being in either direction about original axis X. Although not shown, where the lure has more than one middle body element, alternating body elements will pivot vertically and horizontally about the adjoining body element attached thereinbetween along axes that are not parallel to each other to achieve a curved shape and an undulating movement of the lure.

To secure the connection between adjacent body elements, it is advantageous to construct the lure 10 with a bore extending through the middle body element 30 that is aligned with a corresponding bore through the front body element 20 when the lure 10 is assembled. A pin, nail or other like securing member is then inserted therethrough. The middle body element 20 can also be constructed with two bores for receiving a pin through a bore in each of the front 20 and the rear 40 body elements.

Figure 2C:
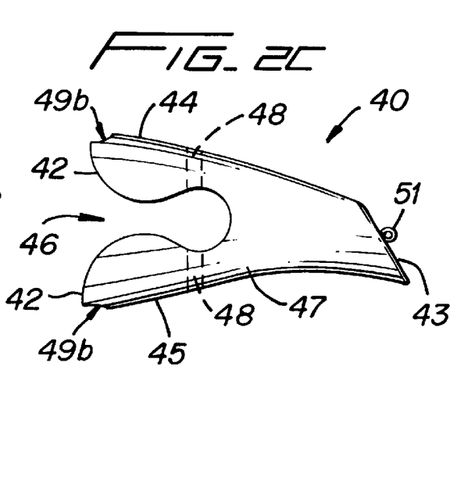
FIG. 2C: the rear body element.
Figure 3A:
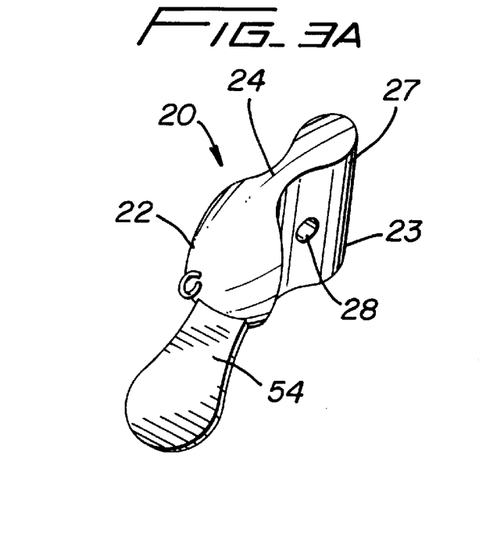
FIG. 3 is a view of the fishing lure of FIG. 2 showing each of the body elements of FIGS. 2A–2C in a perspective view labeled as FIGS. 3A–3C, respectively.
Figure 3B:
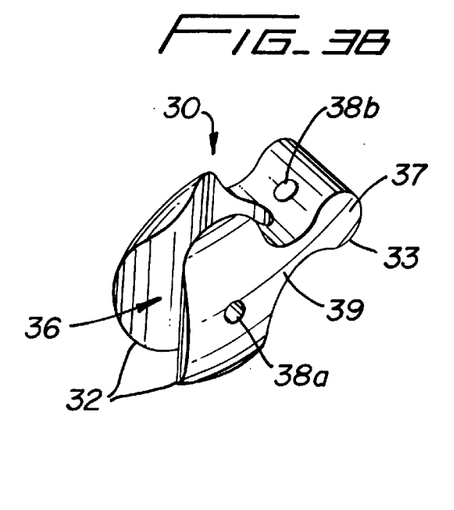
Figure 3C:
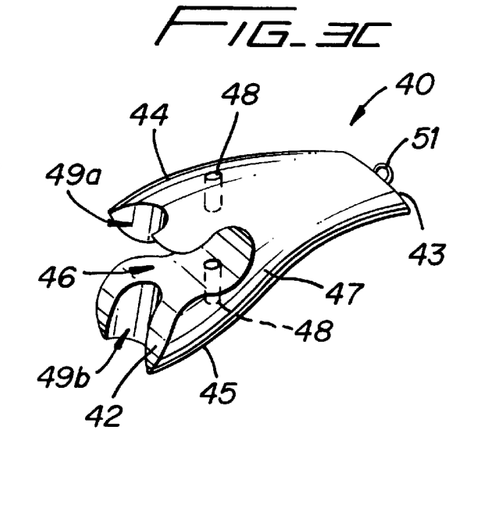
Figure 5A:
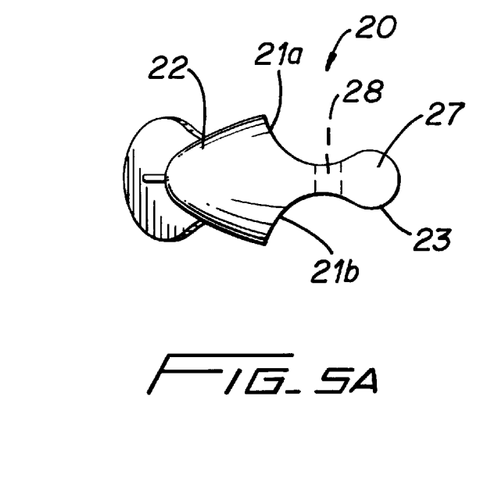
Figure 5B:
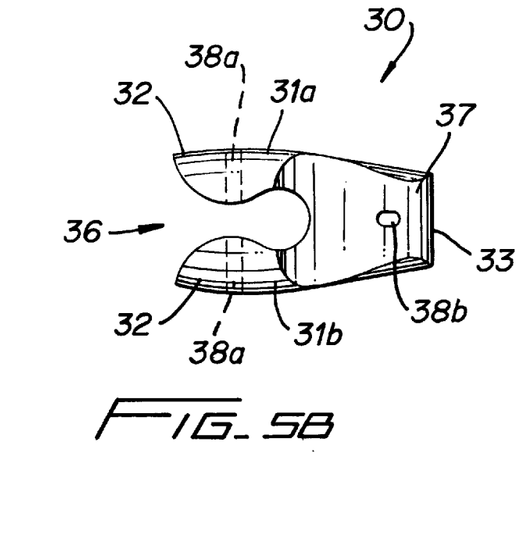
FIG. 5B: the middle body element.
Figure 5C:
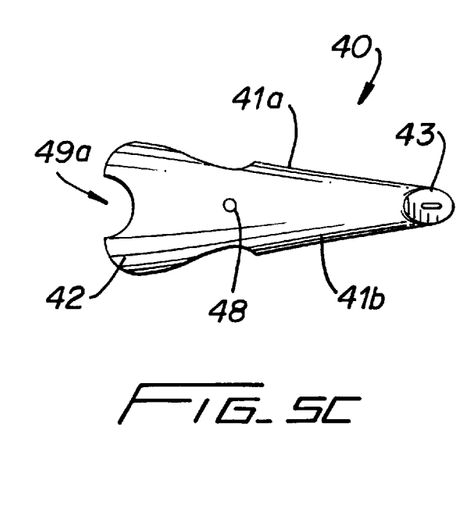
FIG. 5C: the rear body element.
Figure 6A:
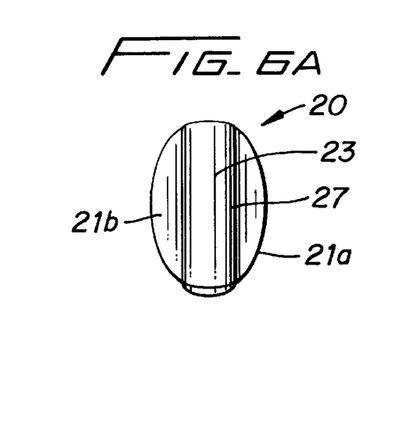
FIGS. 6A–6C are rear end views of each of the body elements of the fishing lure of FIG. 1, with FIG. 6A: the front body element.
Figure 6B:
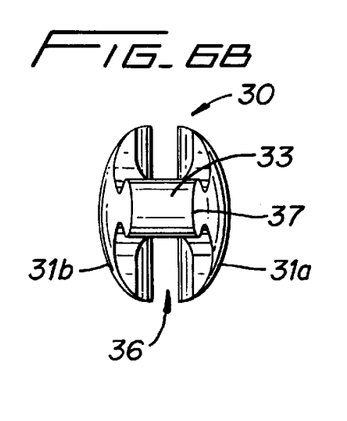
Figure 6C:
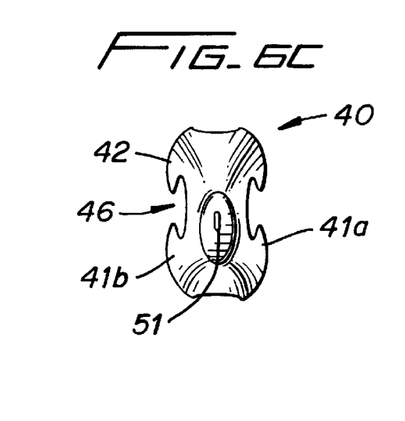
Figure 7A:
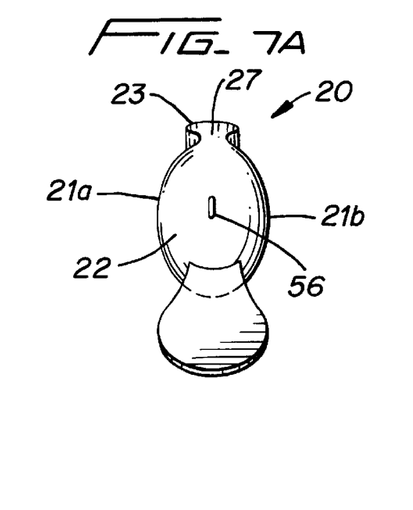
FIGS. 7A–7C are front end views of each of the body elements of the fishing lure of FIG. 1, with FIG. 7A: the front body element.
Figure 7B:
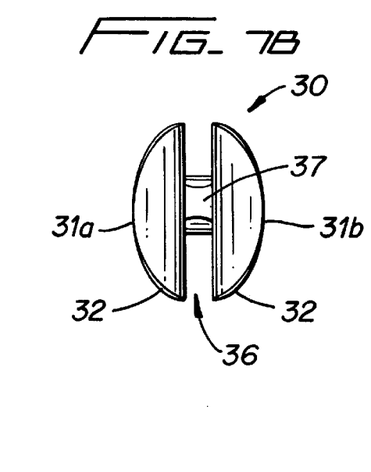
Figure 7C:
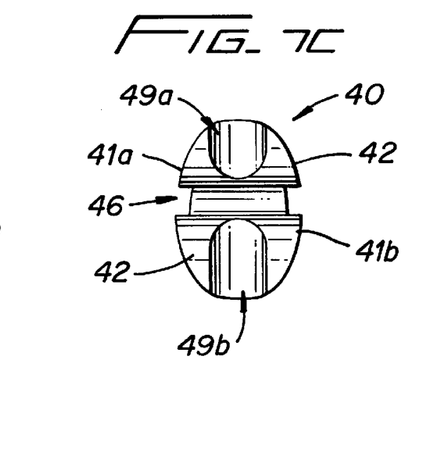
Figures 8A, 8B:
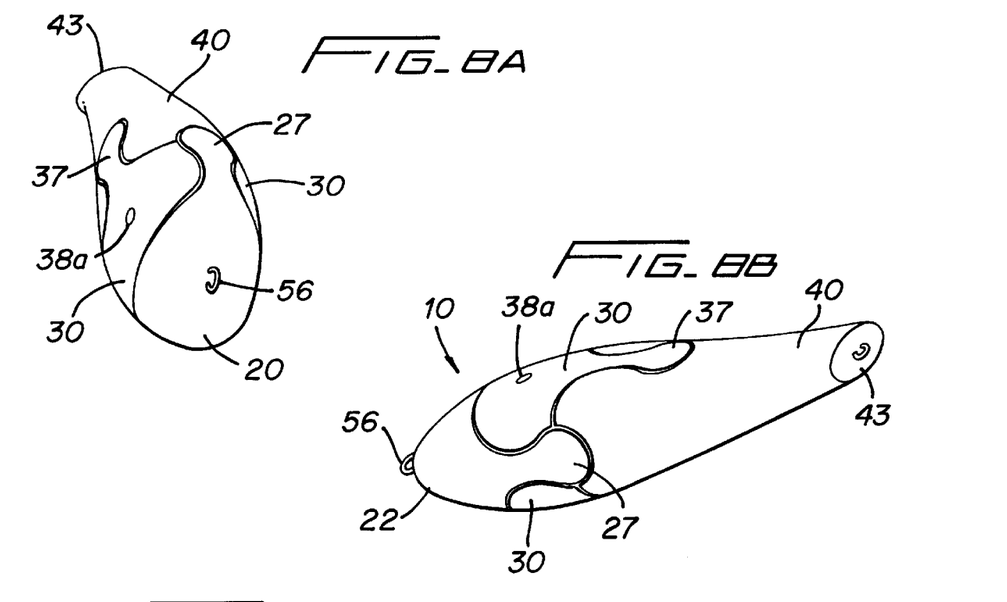
Figure 8C:
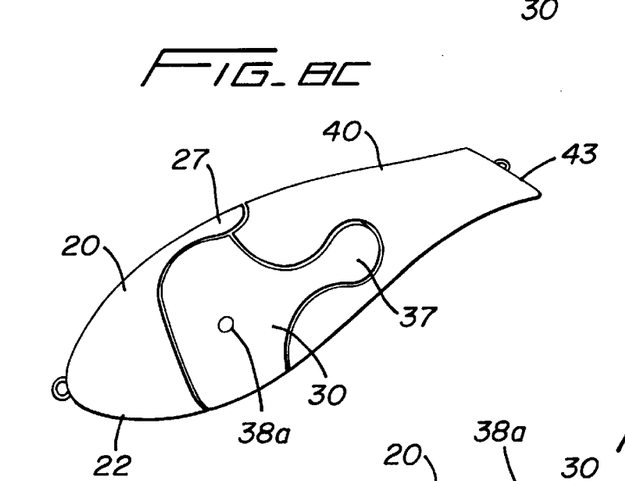
Figure 8D:
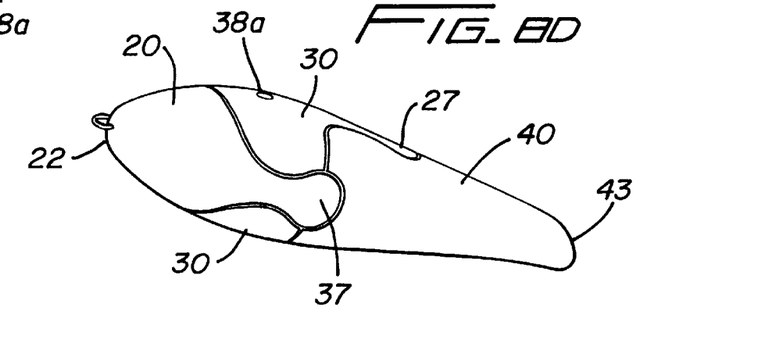
FIG. 8D: a side to under surface view.

As illustrated in FIG. 5, a bore 38a is provided through the middle body element 30 at slot 36 that extends from sides 31a to 31b, and a corresponding bore 28 is provided in the front body element 20 through the extension member 27 from sides 21a to 21b. Bores 28 and 38a are aligned when the body elements 20 and 30 are nested together, and a pin 12a is inserted therethrough to secure these two body elements together. As depicted in FIGS. 2 and 3, a second bore 38b can be provided through the extension member 37 of the middle body element 30 from the top (upper) surface 34 to the bottom (under) surface 35, that aligns with a corresponding bore 48 through the rear body element 40 at slot 46 extending from upper surface 44 to lower surface 45. A pin 12b is inserted therethrough to add strength to the product. Advantageously, lure 10 can be constructed with a single pin 12a through a single bore 38a to join together the front and middle body elements 20, 30, to maintain all the body elements assembled together regardless of the number of middle body elements that are included.

The articulating fishing lure 10 includes one or more hooks 50, such as a treble hook, attached to one or more body elements. The hook 50 can be attached by a connecting member 51 such as a bracket, hook, and the like. The lure 10 can also include a eye bolt 56 or other like member to secure a leader line thereto, as shown attached to front body element 20 (FIG. 1).

The lure 10 can also include a dive plate 54 that is integrally attached to the front body element 20 and projects forward and downward therefrom. The dive plate 54 contributes to the diving action causing the lure 10 to submerge and remain at a desired depth as the lure 10 is pulled through the water. The dive plate 54 also provides resistance to the water as the lure 10 is pulled and causes the body elements 20, 30 and 40 to articulate and undulate freely. The dive plate 54 can project at varying angles from the horizontal axis X as shown in FIG. 1, to achieve different depths. The diver 54 is preferably clear and can be integrally molded with the front body element 20 as a unitary piece, or attached to the front body element 20, for example, by the use of an epoxy or other adhesive, or other suitable connecting means as known and used in the art.

The body elements can be manufactured as a solid mass throughout or, preferably, with an interior hollow chamber or cavity (not shown) to provide air pockets so that the lure will be light in weight and have a sufficient amount of buoyancy for floating and moving through the water during use. Where a cavity is provided, the body element can be manufactured as two halves, each with a depression, that are joined together with an epoxy or other adhesive to form the body element with a cavity therein. Optionally, a weight material (not shown) can be placed inside the cavity to increase the weight of the lure, for example, steel bead shot, and the like.

In general, the material used to manufacture the fishing lure 10 has a density and specific gravity effective to achieve the desired flotation of the lure 10, and sufficient strength to retain one or more hooks fastened thereto. Suitable materials for forming the fishing lure include, for example, balsa wood, birch wood, ABS plastic, butyrate plastic, styrene plastic, and the like. The individual body elements of the fishing lure can be manufactured from a thermoplastic material according to known techniques in the art, for example, by compression molding, injection molding, blow molding to form a hollow article, and the like. It is also desirable to decorate the outside surfaces of the body elements of the lure, for example by coloring or painting, by applying decals, and the like, to simulate the pattern of a bait fish such as minnows, shad, and the like.

To assemble the individual body elements, the interfitting extension 37 of middle unit 30 is slid into the slot 46 of the rear body unit 40, and the interfitting extension 27 of the front unit 20 is slid into the slot 36 of the middle unit 30. Additional middle sections 30 (shown as 130a, 130b and 130c in FIGS. 9 and 10) can be likewise assembled and linked with the front and rear body units. The lure is advantageously assembled starting with the rear body element 40 and adding middle units 30, ending with the front body element 20. Pin 12a can then be inserted into bore 38a to secure the front and middle body units 20, 30 together.

In operation, as the lure is reeled in, the resistance of the dive plate 54 against the water causes the lure 10 to dive, preferably to a depth of about 4–6 feet, and the body elements to articulate and simulate the natural swimming motion of a fish in both vertical and lateral directions.

The articulated fishing lure 10 can be sold assembled or the individual components can be packaged as separate components as part of a kit for later assembly by the user. The kit can include, in combination, a front body element 20 with or without an attached dive plate 54; one or more middle body elements 30; and a rear body element 40. A body element can include a center portion that is hollow, optionally including a weight material. A body element can also be provided in the form of two separate halves, each with a depression therein, such that a cavity is provided within the body element when the two halves are assembled. The fishing lure kit can also include one or more additional components, including: a hook 50 attached to a body element or packaged as a separate component; a dive plate 54 attached to the front body element 20 or packaged as a separate component; a pin 12a and/or 12b for securing adjacent body elements together; a weight material such as steel shot that is sized for insertion into a cavity within a body element; a bracket or other like member for connecting the hook 50 to a body element; an epoxy or other like adhesive for attaching the diver 54 to the lure 10 and/or sealing two halves of a body element; paint, decals or other like material for decorating the outside surfaces of the body elements; and/or directions for assembling the components of the lure 10, for decorating the lure, and/or for using the lure for fishing.

The invention has been described by reference to detailed examples and methodologies. These examples are not meant to limit the scope of the invention. Variation within the concepts of the invention are apparent to those skilled in the art. The disclosures of the cited references are incorporated by reference herein.

What is claimed:

1. An articulating fishing lure, comprising:

a body having three interfitting sections joined together for articulated movement composed of a front body element pivotally connected to a middle body element that is pivotally connected to a rear body element; the body elements pivotally connected by a joint element composed of a slot in one body element into which is inserted an interfitting extension member of an adjacent body element, with the extension member sized to move freely in the slot; each of the body elements having a first end portion, a second end portion, and a middle portion thereinbetween, and each of said portions having a height;

the front body element having an extension member at the second end portion; the middle body element having a slot in the first end portion and an extension member at the second end portion, with the height of the first end portion greater than the height of the second end portion greater than the height of the middle portion; and the rear body element having a slot in the first end portion;

the extension member of the first body element inserted into the slot of the middle body element, the extension member of the second body element inserted into the slot of the rear body element, and a pin inserted through a bore in the the front and middle body elements to secure said body elements together; and the front and rear body elements each having a pivot axis and being pivotal to the middle body element in a vertical and a horizontal plane; wherein when the front body element is moved in a direction alone the vertical or horizontal plane, the rear body element moves in the same direction along the vertical or horizontal plane, respectively, such that the pivot axis of the front body element is at an angle to the pivot axis of the rear body element; and the body elements move freely and articulate when the lure is pulled through the water.

2. The articulating fishing lure according to claim 1, wherein the front body element and the rear body element overlap the middle body element.

3. The articulating fishing lure according to claim 1, wherein the rear body element has a second slot sized to receive a portion of the extension member of the front body element therein.

4. The articulating fishing lure according to claim 1, wherein the middle body element is composed of a second interlinking middle body element having a slot in the first end portion and an extension member at the second end portion, with the height of the first end portion greater than the height of the second end portion greater than the height of the middle portion; the extension member of the first body element inserted into the slot of the second middle body element, the extension member of the second middle body element inserted into the slot of the rear body element, and a pin inserted through a bore in the the front and second middle body elements to secure said body elements together.

5. The articulating fishing lure according to claim 1, further comprising a hook attached to a body element.

6. The articulating fishing lure according to claim 1, further comprising a dive plate integrally attached to the front body element and projecting forward and downward therefrom.

7. The articulating fishing lure according to claim 1, wherein the body elements include a hollow cavity therein.

8. The articulating fishing lure according to claim 7, wherein the hollow cavity includes a weight material sealed therein.

9. The articulating fishing lure according to claim 1, wherein the lure is in a fishlike form with a head, middle and tail sections.

10. An articulating fishing lure, comprising:

a body having three interfitting sections joined together for articulated movement composed of a front body element pivotally connected to a middle body element that is pivotally connected to a rear body element; the body elements pivotally connected by a joint element composed of a slot in one body element and an interfitting extension member of an adjacent body element, with the extension member sized to move freely in the slot; each of the body elements having a first end portion, a second end portion, and a middle portion thereinbetween, and each of said portions having a height;

the front body element having a slot in the second end portion;

the middle body element having an extension member at the first end portion and a slot in the second end portion, with the width of the first end portion greater than the width of the second end portion greater than the width of the middle portion; and the rear body element having an extension member at the first end portion;

the slots of the front and middle body elements being sized and configured to receive the extension members of the middle and rear body elements, respectively, therein;

the front and middle body elements each including a bore with a pin inserted therethrough to secure said body elements together; and the front and rear body elements each having a pivot axis and being pivotal to the middle body element in a vertical and a horizontal plane; wherein when the front body element is moved in a direction along the vertical or horizontal plane, the rear body element moves in the same direction along the vertical or horizontal plane, respectively, such that the pivot axis of the front body element is at an angle to the pivot axis of the rear body element; and the body elements move freely and articulate when the lure is pulled through the water.

11. A fishing lure kit, comprising, in combination:

three interfitting sections composed of a front body element, a middle body element, and a rear body element;

the body elements pivotally connectable by a joint element composed of a slot in one body element and an interfitting extension member of an adjacent body element, with the extension member sized to move freely in the slot; each of the body elements having a first end portion, a second end portion, and a middle portion thereinbetween, and each of said portions having a height;

the front body element having an extension member at the second end portion;

the middle body element having a slot in the first end portion and an extension member at the second end portion, the slot being sized and configured to receive the extension member of the first body element therein, with the height of the first end portion greater than the height of the second end portion greater than the height of the middle portion; and the rear body element having a slot in the first end portion, the slot being sized and configured to receive the extension member of the second body element therein; and the front and middle body elements each including a bore for receiving a pin therethrough to secure said body elements together;

wherein when assembled together with the extension member of the first body element inserted into the slot of the middle body element, the extension member of the second body element inserted into the slot of the rear body element, and a pin inserted through a bore in the the front and middle body elements to secure said body elements together, the front and rear body elements each have a pivot axis and are pivotal to the middle body element in a vertical and a horizontal plane such that when the front body element is moved in a direction along the vertical or horizontal plane, the rear body element moves in the same direction along the vertical or horizontal plane, respectively, and the pivot axis of the front body element is at an angle to the pivot axis of the rear body element, and the body elements move freely and articulate when the lure is pulled through the water.

12. The kit according to claim 11, further comprising a component selected from the group consisting of:

one or more additional middle body elements; a hook; a dive plate; a pin for securing adjacent body elements together; a weight material sized for insertion into a cavity within a body element; a member for connecting the hook to a body member; an adhesive; a material for decorating the body elements; and directions for assembling and using the lure.

13. The kit according to claim 12, wherein the body elements are assembled together, and the kit includes one or more components packaged separately.

14. The kit according to claim 11, wherein a hook is attached to a body element.

15. The kit according to claim 11, wherein a dive plate is attached to the front body element.

16. The kit according to claim 11, wherein a body element is composed of two separate halves, each with a depression therein; wherein when the two halves are assembled, a cavity is provided within the body element.

* * * * *